United States Patent
Brassil

(10) Patent No.: US 8,493,443 B2
(45) Date of Patent: Jul. 23, 2013

(54) METHODS AND APPARATUS FOR LOCATION DETERMINATION AND ASSERTING AND MAINTAINING PRIVACY

(75) Inventor: John Thomas Brassil, Belle Mead, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1976 days.

(21) Appl. No.: 11/028,738

(22) Filed: Jan. 4, 2005

(65) Prior Publication Data

US 2006/0170767 A1 Aug. 3, 2006

(51) Int. Cl.
*H04N 7/18* (2006.01)

(52) U.S. Cl.
USPC .......................................... 348/143

(58) Field of Classification Search
USPC .......................................... 348/143
See application file for complete search history.

(56) References Cited

U.S. PATENT DOCUMENTS

| | | | |
|---|---|---|---|
| 6,067,399 A | 5/2000 | Berger | |
| 6,509,926 B1 | 1/2003 | Mills et al. | |
| 6,697,103 B1 * | 2/2004 | Fernandez et al. | 348/143 |
| 2002/0008758 A1 | 1/2002 | Broemmelsiek et al. | |
| 2003/0013459 A1 * | 1/2003 | Rankin et al. | 455/456 |
| 2003/0187803 A1 | 10/2003 | Pitt | |
| 2003/0231769 A1 | 12/2003 | Bolle et al. | |
| 2004/0105005 A1 | 6/2004 | Yamamoto et al. | |
| 2004/0135885 A1 | 7/2004 | Hage | |
| 2004/0145657 A1 | 7/2004 | Yamamoto et al. | |
| 2006/0064384 A1 * | 3/2006 | Mehrotra et al. | 705/57 |
| 2006/0137018 A1 * | 6/2006 | Herschaft | 726/26 |

FOREIGN PATENT DOCUMENTS

| | | |
|---|---|---|
| WO | WO99/13443 | 3/1999 |
| WO | WO 03/049009 | 6/2003 |

OTHER PUBLICATIONS

N. Kaye, "Have You Called Your Car Lately", The New York Times, Nov. 5, 2004.
"Payless Franchisee, California A.G. Settle Case Involving GPS Tracking of Car Renters", Court Proceedings, Electronic Commerce & Law, vol. 9, No. 44, Nov. 17, 2004.

* cited by examiner

Primary Examiner — Richard Torrente

(57) ABSTRACT

A method of and apparatus for maintaining the privacy of a subject of a recording are disclosed. The location of at least one subject is determined. The location of the subject is stored in a database. The location of a recording device when a recording is made is determined. The location of the recording device is provided to the database.

41 Claims, 3 Drawing Sheets

METHODS AND APPARATUS FOR LOCATION DETERMINATION AND ASSERTING AND MAINTAINING PRIVACY

BACKGROUND

Video and closed-circuit television surveillance cameras have become widespread in public spaces. While these are widely accepted as serving legitimate and useful purposes, concerns have been expressed about the loss of privacy that results. The recent popularity of mobile telephones including cameras exacerbates this concern, because such cameras are both portable and inconspicuous. The camera-telephone thus increases the probability of a subject's being photographed at a place where that subject has no reason to expect that any camera is present, and increases the probability of the subject's remaining unaware that he or she has been photographed.

The loss of privacy to a person caused by the existence of a photograph or video recording showing that person in a public place is usually not great. However, if the recording is widely broadcast or distributed, the loss of privacy is greatly increased.

SUMMARY

In an embodiment of a method of and apparatus for maintaining the privacy of a subject of a recording, the location of at least one subject is determined. The location of the subject is stored in a database. The location of a recording device when a recording is made is determined. The location of the recording device is provided to the database. It is determined from the provided locations whether at least one subject is in the recording, and when at least one subject is determined to be in the recording, information that at least one subject is in the recording is provided.

It is to be understood that both the foregoing general description and the following detailed description are exemplary and explanatory only.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiment of the present invention, example of which is illustrated in the accompanying drawings.

Figure 1:
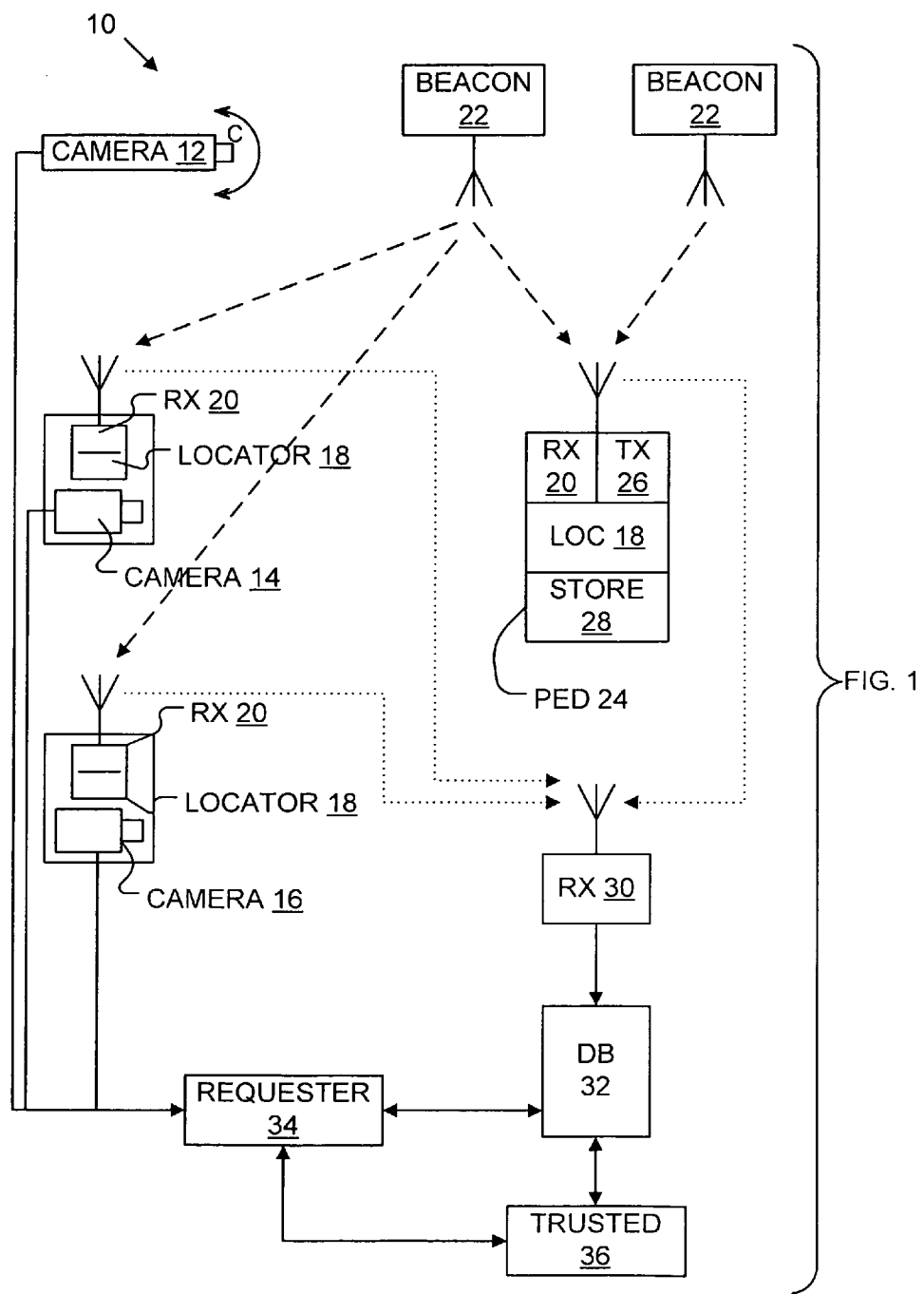
FIG. 1 is a diagram of a system in accordance with an embodiment of the invention.

Referring initially to FIG. 1, a first embodiment of a system according to an embodiment of the invention, indicated generally by the reference number 10, comprises a number of cameras 12, 14, 16. By way of example, a first camera 12 is a fixed video surveillance camera, a second camera 14 is a mobile still picture camera, and a third camera 16 is a mobile video camera.

Each of the mobile cameras 14, 16 is equipped with a locator 18. The locator 18 may be any device that enables the location of the camera 14, 16 at a specific time to be determined with a desired accuracy. For example, the locator 18 may have a radio receiver 20 that receives accurately timed radio transmissions from remote beacons 22. Merely by way of example, at the time of writing Global Positioning System (GPS) receivers are widely commercially available, and enable a location almost anywhere on the surface of the Earth to be determined to an accuracy of about ±4 meters (about 13 feet) using signals received from a system of satellite beacons in Earth orbit. Numerous other location systems exist, or have existed in the past, and it is contemplated that other systems will exist in the future, which may offer greater or lesser accuracy. Any suitable location system may be used in the present embodiment. The locator 18 may include a clock. Alternatively, if the transmissions from the remote beacons 22 include time data, the locator 18 may rely on the transmitted time data.

A subject who does not wish to be photographed (not shown) carries a Privacy Enablement Device (PED) 24. It will be appreciated that there will typically be large numbers of PEDs 24. However, in the interests of simplicity, only one PED 24 is shown in FIG. 1. The PED 24 comprises a locator 18, with a receiver 20, and a transmitter 26. In the embodiment shown in FIG. 1, the PED 24 also comprises a storage device 28. The storage device 28 may be a non-volatile storage device, so that data stored in the storage device 28 is not lost if the PED 24 is powered down before the data is uploaded. The locator 18 may be any device that enables the location of the PED 24 at a specific time to be determined with a desired accuracy.

Where the system 10 includes both PEDs 24 and mobile cameras 14, 16, it may be advantageous for the locators 18 of more than one of the mobile devices 14, 16, 24 to use the same positioning system. Then, if an error occurs in a reference signal used by the locators 18, it may have the same effect on all locators 18 in the same vicinity. The relative location of a camera 14, 16 and a PED 24 can be accurately determined if their locators 18 have the same error, even though their absolute positions may be incorrect. The locators 18 on the mobile cameras 14, 16 may be identical to PEDs 24.

The PED 24, by its transmitter 26, transmits its location to a receiver 30, which forwards the information to a clearinghouse having a database 32. The embodiment shown in FIG. 1 is shown with a single, central database. However, as discussed below, the database 32 may be multiple databases and/or may be decentralized. If the location is transmitted immediately upon being determined by the locator 18, the location may be time-stamped by the database 32 on receipt. Instead, or in addition, the PED 24 may transmit the time at which the location is determined as well as the location. A person on foot can typically walk at up to 2 m/s, and run somewhat faster. Therefore, using a GPS receiver 18 with an accuracy of 4 meters, merely by way of example it may be appropriate to determine the location about once per second. The optimum frequency with which the location of the PED is updated may be greater or less, depending on a variety of factors, including the nature and expected behavior of the subjects, the accuracy of the location system used, and the properties of the communication link between the transmitter 26 of the PED 24 and the receiver 30. Each location, including a time-stamp, and including an identifying serial number for the originating PED 24, requires a few tens of bytes of data, so the stream of data from a PED 24 can be transmitted with very little bandwidth, and can be stored in a few hundred kilobytes per hour of storage.

If continuous transmission from the PED 24 is not appropriate, for example, because there are no compatible receivers in a particular area, or because the PED is in a location such as a hospital or an airport where radio transmissions are prohibited, the location data can then be recorded on the storage device 28, and transmitted to the receiver 30 as a batch upload at a more convenient time. Over a telephone-quality link, a few tens of seconds of transmission is required for each hour of recorded positions.

If the subject carrying the PED 24 is, for example, a motor vehicle, then it may be able to move faster than 2 m/s. Speeds of the order of 30 m/s, or even faster, are typically permitted for motor vehicles on highways. However, motor vehicles moving at high speed are less maneuverable than pedestrians. In particular, they tend to remain on defined highways, and to move at fairly steady speeds. Consequently, a PED 24 that records a location once per second typically enables the position of a motor vehicle to be interpolated with an accuracy comparable to the positional accuracy of the GPS system.

The database 32 contains at least data recording that a PED 24 determined itself to be in a particular location at a particular time. If it is desired to interpolate the position of a PED 24 between reported locations, then the database 32 contains some identification of each PED, such as a serial number, and associates each location report with the correct PED. The location information may then be recorded as trajectory for the PED 24, rather than as a series of points.

Depending on the exact purpose of the database 32, the database may also record other information, such as the identity of the user of a specific PED 24, or may avoid recording that information. As will be explained in more detail below, the database 32 may also contain additional information about the preferences of the user of a specific PED 24.

Any of the cameras 14, 16 may have a transmitter 26 similar to that on the PED, and may send location data for the camera to the database 32 via the receiver 30. Alternatively, however, a mobile camera 14, 16 may append the location and time of its recordings to the respective recording.

Figure 2:
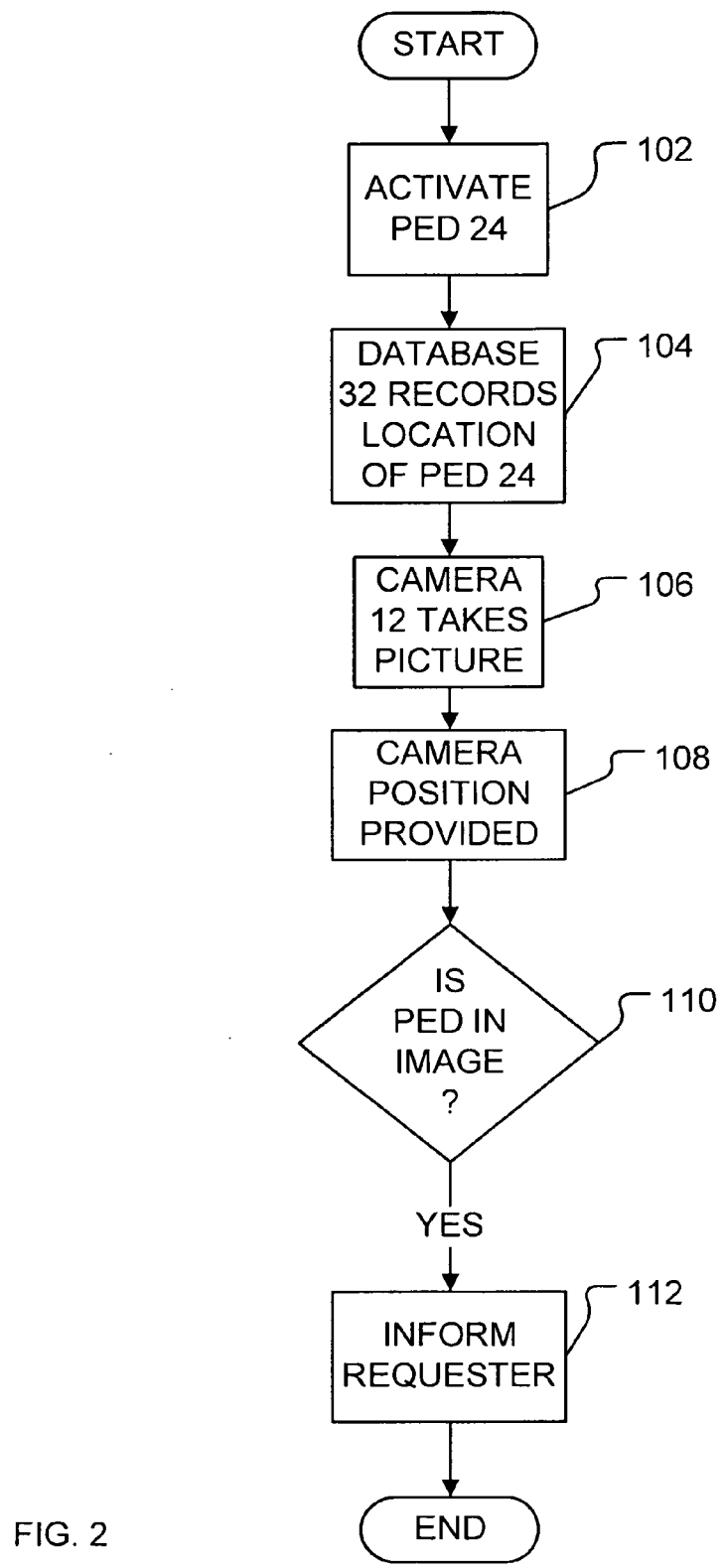
FIG. 2 is a flowchart of a method in accordance with an embodiment of the invention.

Referring now to FIG. 2, in one embodiment of a method of protecting privacy, in step 102 a possessor of a PED 24 activates the PED. In step 104, the PED 24 generates location data, which are stored in the database 32.

In step 106, a camera 12, 14, 16 takes an image, which may be, for example, a still picture, a video, or a succession of stills forming a time-lapse video. The camera 12, 14, 16 may, for example, be operating continuously, or it may be actuated to take a single picture or video shot. The location of the camera is also recorded. If the camera is a fixed camera 12, its location may have been established and recorded when the camera was installed. If the camera is a mobile camera 14, 16, its location may be established by a locator 18 at the time when the picture is taken, or may be recorded in some other way, for example, by the camera operator separately determining and recording his or her location. The location of the camera 14, 16 may be transmitted to the database 32, appended to the image, or recorded in some other way.

A requester 34 subsequently wishes to use the image recorded in step 106 without interfering with the privacy of any subject using a PED 24. At step 108, the requester 34 provides to the database 32 the location (including the time) at which the image was taken, and requests a check on that location.

At step 110, the location provided for the camera 12, 14, 16 is compared with the locations of PEDs 24 in the database, and if it is determined that a subject using a PED 24 may be in the image, at step 112 the requester is informed accordingly.

Figure 3:
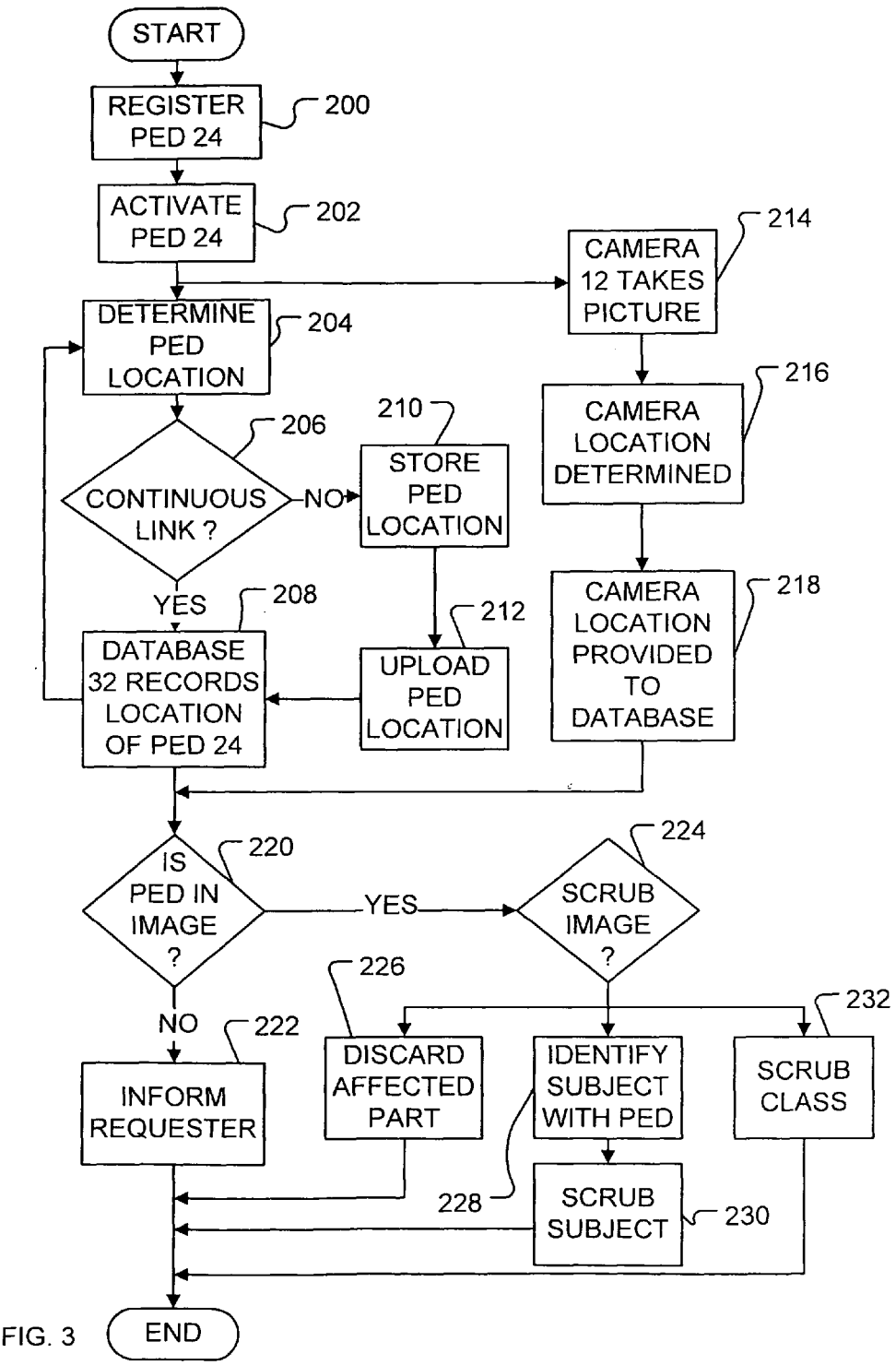
FIG. 3 is a flowchart of another method in accordance with an embodiment of the invention.

Referring now to FIG. 3, in another embodiment of a method of maintaining the privacy of a subject provided with a PED 24, in step 200 an entity who wishes to assert a desire for privacy obtains and registers the PED 24. Depending on the circumstances, this may be a totally anonymous transaction, in which the central database 32 is merely informed that a PED 24 with a specified serial number is in valid use. In principle, even registering a serial number is unnecessary: the database 32 could be configured to accept and record any transmission having a correct format. In the present embodiment, however, some authentication is usually desired, to reduce the risk of the system being disrupted by spurious or falsified signals.

Alternatively, the subject, or an entity sponsoring the subject, may register some details with the central database 32. The use of these details will be explained below at steps 220 to 232. For example, the entity may register whether the subject protected by the PED 24 is a person, a motor vehicle, or some other subject. The entity may register a preference for the level of protection desired. For example, to protect the privacy of a mid-sized, mass produced, black sedan it may be sufficient to ensure that the license plate is unreadable. To protect a more distinctive vehicle, the entity might request that the vehicle not appear in published images at all. Most human beings would consider it sufficient that their faces be rendered unrecognizable, but some people, for example, an individual with a very distinctive style of dress, might consider that inadequate.

If the subject is charged a fee for the use of the PED 24, then the level of the fee may be dependent on the level of privacy requested. On the other hand, the subject might offer to waive the default level of privacy associated with the PED 24 in exchange for a fee from a requester 34 (see FIG. 1) desiring to use an image in which the subject happens to appear. If communication with the subject or sponsoring entity is required for any reason, then the database 32 would contain contact details. The clearinghouse maintaining the database 32 would then be trusted not to disclose these details, or to disclose them only on specified conditions, and might need to act as an intermediary between a requester and a subject.

At step 202 the subject activates the PED 24. At step 204, the PED 24 generates location data. At step 206, it is determined whether there is a continuous data link from the PED 24 to the receiver 226. If so, in step 208 the position data determined in step 204 are stored in the database 32. If there is not a continuous data link, in step 210 the position data are stored in the storage device 28 on the PED 24, and in step 212 the data are transferred, either as an update when the data link is restored or in a batch process. If there is a continuous data link, the location data may be uploaded to the database 32 immediately they are generated. The time at which the data are generated may then be added to the location at the receiver 30 or the database 32. Alternatively, the time may be included in the location data by the PED 24, using a clock on the PED. If the position data are stored by the storage device 28 on the PED 24, then the PED 24 will determine and store the time when determining and storing the position. Because accurate timing is desirable, the clock on the PED 24 may be verified against an accurate master clock when the PED 24 uploads location data.

The process of generating and uploading location data continues as long as the PED 24 remains active, as is symbolized in FIG. 3 by the loop through steps 204, 206, and 208. It will be understood that there may be many PEDs 24 active at any time, some of them transmitting location data to the database 32 in real time, and some of them storing location data in memory 28, either because they are unable to establish a data link, or because they are configured to operate in a batch mode.

In step 214, a camera 12, 14, 16 takes an image, which may be, for example, a still picture, a video, or a succession of stills forming a time-lapse video. The operation of the camera 12, 14, 16 is independent of, and probably unknown to, the subject with the PED 24. However, later steps of the process shown in FIG. 3 will return a null result unless the PED 24 is active when the image is taken. Therefore, step 214 is shown in FIG. 3 as occurring after step 202, and in parallel with steps 204, 206, 208. The camera 12, 14, 16 may, for example, be operating continuously, or it may be actuated to take a single picture or video shot.

In step 216, the location of the camera is recorded, if necessary. If the camera is a fixed camera 12, its location may have been established and recorded when the camera was installed. Step 216 then comprises identifying the correct camera, and matching the image taken in step 214 to the correct camera, and thus to the pre-recorded camera location. If the camera is a mobile camera, step 216 may comprise determining the location of the camera using a locator 18 attached to the camera, or otherwise kept close enough to the camera to give a meaningful location for the camera. The locator 18 may record a continuous series of locations, as described above for the PED 24, or may record a location when the associated camera 14, 16 is operated. Alternatively, the camera operator may record in some other way the location of the camera when it is used. The location of the camera 14, 16 may be transmitted to the database 32, appended to the image, or recorded in some other way.

At some later time, an entity, the "requester" 34 (see FIG. 1), wishes to use the image recorded in step 214. The requester 34 wishes to ensure that a subject who was signaling a desire for privacy by operating a PED 24 does not appear in the image. At step 218, the requester provides to the database 32 the location (including the time) at which the image was taken, and requests a check on that image. If the location of the camera 14, 16 is already recorded in the database 32, step 218 may comprise providing to the database 32 the identity of the camera and the time at which the particular image was taken. If the camera location is stored each time an image is taken, the time information may be implied by identifying a specific image.

As shown in FIG. 3, it is assumed that the requester 34 contacts the clearing-house after the location of the PED 24 has been stored in the database 32. Thus, if the PED 24 is uploading its location data to the database 32 in a batch mode, and the requester 34 wishes to use images that have been taken very recently, there is a risk that the presence of a subject with an active PED in the image may not be detected because the PED's location data are not yet in the database 32. This is a risk that the user of the PED 24 may choose to accept by uploading the location data relatively infrequently.

At step 220, the location provided for the camera 12, 14, 16 is compared with the locations of PEDs 24 in the database. If the camera 12 is a completely fixed camera, the camera location information may specify the field of view of the camera to any degree of accuracy that the database 32 supports. If the camera is, for example, rotatably mounted on a fixed mount, the camera location information may include information on the direction in which the camera was pointing when the image in question was taken. If such direction information is not available, it may be necessary to treat the entire field that the camera can scan as being within the field of view of the camera at all times. If the camera 14, 16 is mobile, it may be necessary to treat the entire 360° circle of view from the location of the camera as being within the camera's field of view. In situations where a view upward or downward from the camera location is relevant, it may be necessary to treat the entire sphere of view as being within the camera's field of view. For a still picture camera, a locator 18 that recorded the orientation of the camera at the instant when the image was taken presents no technical difficulties, but might be expensive and heavy. For a video camera, recording the orientation may be more complicated if the camera moves during a shot.

Depending on the accuracy of the camera location, and whether a topographical map is used in either step 216 or step 220, in order to ensure that no subject using a PED 24 is in the image, it may be necessary to object to images in which the PED user was not in fact visible, for example, because the PED user was behind the camera, or was hidden by an opaque object. It is therefore in the interests of camera users and requesters to provide accurate information on the position and orientation of their cameras.

A completely conventional fixed security camera 12 can be used in the system 10, provided that its location is determined. A conventional rotatably mounted security camera 12 can be used in the system 10, but more accurate determinations may be obtained if the camera 12 is fitted with a device to determine and record which way the camera is pointing when an image is taken. In the embodiment shown in FIG. 1, mobile cameras 14, 16 are provided with locators 18. A locator 18 can be provided without integrating the camera and the locator, so retrofitting existing cameras with a locator is entirely feasible. However, more accurate determinations may be obtained if the locator 18 is sufficiently integrated with the camera 14, 16 to determine and record which way the camera is pointing when an image is taken.

Alternatively, it may be possible to determine correctly that no objection arises even if a subject is visible in the image. For example, if the standard of privacy desired, either by default or by a preference recorded in the database 32, is that the subject is a person and the person's face should not be recognizable in the image, then a subject more than a certain distance from the camera may be disregarded. The distance from the camera to the subject is derived from the locations of the camera and the subject as already determined. For this purpose, it may be helpful to know the angular resolution of images produced by the particular camera 12, 14, 16, so that the distance to the subject can be accurately converted into a linear resolution of the subject. If the angular resolution of the individual camera is not known, then the resolution of the highest resolution camera in the system 10 may be assumed.

It may be appropriate to make an initial determination whether any active PED 24 was within a certain, comparatively large, distance from the camera within a specified period of time around the time when the image was taken. Then, if this initial determination indicates the presence of a subject with a PED 24, a second and more careful determination may be made, which may involve, for example, calculating the precise field of view of the camera and the trajectory of the subject identified in the first determination. This approach may give more efficient use of resources if the density of active PEDs is low, so that a high proportion of images can be cleared by the initial determination as not showing any subject with an active PED.

If it is determined in step 220 that no subject using a PED 24 is in the image, at step 222 the requester is informed that the database 32 shows no objection to using the image. If it is determined at step 220 that a subject using a PED 24 is in the image, at step 224 a choice may be made between several courses of action in order to "scrub" the image to meet the privacy demands of the subject.

First, in step 226 the image may simply be discarded. That may be unattractive to the requester. However, in commercial photography it is common to take several almost identical photographs and select the "best" one later. Having to reject an otherwise satisfactory photograph because somebody walked across the background at the wrong time is a familiar hazard of shooting in a public place. In the case of video images, it may be necessary to exclude only a short part of a long image. Whether this is acceptable to the requester depends on what the video image is and what it is to be used for.

Second, in step 228, it may be possible to identify in the image the subject using the PED 24. If the series of locations recorded by the PED in steps 204 and 208 enables the trajectory of the subject across the field of view of the camera 12 to be determined, then it may be possible to match the trajectory to a visible subject appearing at approximately the predicted location in successive frames of a video image. By way of example, such matching can be done using existing image recognition techniques.

Trajectory matching is most likely to be possible using a fixed video camera 12, because if the location and orientation of the camera 12 are both known then several degrees of freedom are removed from the image recognition process. Trajectory matching is most likely to be successful if the subject remains in the field of view of the camera for a fairly long period, and if the subject and other similar entities in the field of view of the camera are following different paths.

Once the subject has been identified, in step 230 the image can be scrubbed by effectively removing the subject. What constitutes "effectively removing" the subject will depend on the circumstances. For example, the database 32 may contain information specifying the degree of protection that the subject desires. As a default, the scrubbing may provide one or more of: if the subject is a person, rendering that person's face unrecognizable; if the subject is a person, rendering any documents in that person's possession unreadable; if the subject is a document, rendering that document unreadable; or if the subject is a motor vehicle, rendering the vehicle's license plate and other identifying marks unreadable. Once the subject has been identified, techniques for scrubbing an image in this way without detracting from the overall quality of the image are available. If it is necessary entirely to remove images showing the subject, the process may return from step 228 to step 226 with more accurate information on exactly which images, or which segments of a video image, must be discarded.

Third, in step 232, if it was not possible to identify the individual subject, but the database 32 provided sufficient information to identify the type of subject and the nature of the privacy requested, then all possible subjects in the image might be scrubbed to the desired level. For example, the database 32 might identify the subject as a motor vehicle, or the trajectory might be recognizable as that of a motor vehicle. The privacy protection requested by the subject, or the default for motor vehicles, might be to render the license plate unreadable. In that case, it would be relatively simple to render unreadable the license plate of every vehicle in the image.

In some cases, it may be possible to identify the subject approximately. For example, in the case of a stream of people all following the same route at the same speed, which commonly occurs at high pedestrian traffic densities, it may be possible to identify a region of the stream in which the subject with the PED 24 is present, but not to identify the individual subject. In that case, the entity doing the scrubbing might be obliged to scrub all of the people in that region of the stream, but not every person in the image.

In order to avoid explicitly identifying to the requester the subject who has indicated a desire for privacy, the scrubbing may be carried out by a trusted third party 36 (see FIG. 1). The third party 36 receives the image from the requester 34, obtains the identification of the subject in the image from the database 32, scrubs the image, and passes the scrubbed image to the requester. The requester 34 could still identify the subject by a careful comparison of the scrubbed and unscrubbed images. However, the requester 34 would then have to go out of its way to identify the subject; an honestly-intentioned requester could simply refrain from making the comparison. To increase the level of inaccessibility, the whole of steps 218 to 232 could be conducted through the third party 36. The requester 34 could then be provided with an image approved by the database 32 and the third party 36, without even being told whether the image had been scrubbed.

If the intended user of the image is not the person in possession of the unscrubbed image, then it is possible for the third party 36 to receive the unscrubbed image from the person in possession, scrub the image, and pass the scrubbed image to the end user. In many cases, it would then be possible to prevent any person other than the scrubber 36 from having both the scrubbed and the unscrubbed versions of the same image to compare.

To maximize the level of protection of the subject, the subject or sponsor may assert a right to review the scrubbed image to ensure that the subject has been adequately removed. In that case, the third party scrubber 36 would need to communicate with the subject or sponsor using contact details stored in the database 32, either directly or using the clearinghouse as a further intermediary.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

For example, although a radio link from the transmitter 26 to the receiver 30 has been described, other forms of communication could be used, especially if the location information is uploaded in batches, when the user of the PED 24 could establish a specific connection, for example, a landline telephone connection.

For example, in the embodiments shown in the drawings it is assumed for clarity that the making of the recording and the request to the database 32 for clearance are separate events. When, for example, a sporting event is broadcast "live" on television, there is in fact commonly a delay of a few seconds, to enable the broadcasting of unexpected undesirable events to be prevented. When, as is common, the television camera sweeps the audience, that few seconds' delay might allow just enough time for an audience member with a PED 24 to be rendered unrecognizable. A more precise positioning system than GPS might then be desirable, to identify the exact seats occupied by persons with PEDs. Within a defined area such as a sports stadium, special transmitters 22 for a high-accuracy location system could be provided, provided that the receivers 20 on the PEDs 24 are equipped to use the transmissions, and the cameras 12 have sufficiently accurate tracking.

For example, the database 32 does not need to be in a single physical location. Multiple copies of the database 32, or parts of the database, could exist, or the database could be subdivided. In particular, because in the embodiments the determination of whether a subject using a PED 24 is in an image is done by reference to the locations of the PED and the camera 12, 14, 16, the database could be subdivided geographically. Alternatively, or in addition, a distributed database could be used. A situation in which different PEDs 24 in the same area are recorded on different databases 32 is possible. If multiple databases cover the same area, provision may be made for a single search to cover more than one relevant database. Where a recording could include subjects not all in a single database, references to "the database 32" in the context of steps 218 and 220 may then include more than one such database.

For example, the embodiments shown in the drawings relate to the treatment of still or video images made by cameras. However, the methods described could be applied to other forms of recording that may contain information about individuals including, for example, audio recordings.

What is claimed is:

1. A method of maintaining privacy of a subject of a recording, comprising:
    activating a privacy enablement device (PED) to enable a level of privacy of the subject, wherein the level of privacy is selected from a plurality of levels of privacy;
    receiving, from the PED, a location of at least one subject from the PED, wherein at least one subject carries the PED;
    providing the location of the subject to a database;
    receiving a location of a recording device, from the recording device, when a recording is made;
    providing the location of the recording device to the database;
    comparing the location of at least one subject with the location of the recording device;
    determining from the comparison whether at least one subject is in the recording; and
    limiting use of the recording by applying the level of privacy of the subject if the recording includes said subject that uses the PED.

2. A method according to claim 1, further comprising, when at least one subject is determined to be in the recording, providing information that at least one subject is in the recording.

3. A method according to claim 1, wherein determining the location of the at least one subject comprises determining a succession of locations of at least one subject.

4. A method according to claim 3, wherein determining a succession of locations comprises determining locations at different times.

5. A method according to claim 1, wherein determining the location of the at least one subject comprises at least one subject determining the subject's location.

6. A method according to claim 5, wherein providing the location of the at least one subject comprises the subject transmitting the subject's location to the database.

7. A method according to claim 5, wherein providing the location of the at least one subject comprises the subject recording the subject's locations at a succession of times and transmitting the record of locations to the database.

8. A method according to claim 1, wherein the recording device is mobile and determining the location of the recording device comprises determining a succession of locations of the recording device.

9. A method according to claim 8, wherein determining a succession of locations comprises determining locations at different times.

10. A method according to claim 1, wherein the recording device has a restricted field of recording and determining the location of the recording device comprises determining the field of recording of the recording device.

11. A method according to claim 1, further comprising, when at least one subject is determined to be in the recording, providing information identifying parts of the recording in which the subject is determined to be present.

12. A method according to claim 11, wherein the recording extends over time and providing information identifying parts of the recording in which the subject is determined to be present comprises identifying parts of the time in which the subject is determined to be present.

13. A method according to claim 11, wherein the recording comprises an image and providing information comprises identifying parts of the image in which the subject is determined to be present.

14. A method according to claim 1, wherein providing information that at least one subject is in the recording comprises providing said information to an entity desiring to use the recording.

15. A method according to claim 1, wherein providing information that at least one subject is in the recording comprises providing said information to a trusted entity, and wherein said trusted entity prevents an entity desiring to use the recording from using said recording including said subject.

16. A method according to claim 1, wherein limiting use of said recording including said subject further comprises removing from the recording information relating to the at least one subject.

17. A method according to claim 16, wherein limiting use of said recording including said subject further comprises altering parts of an image showing the subject.

18. A method according to claim 16, further comprising providing the recording to a third party, wherein limiting use of said recording including said subject further comprises the third party altering the recording to remove said information, and the third party providing the altered recording to a requester.

19. A method according to claim 16, wherein limiting use of said recording including said subject further comprises storing in the database information specifying alterations to be made to recordings of a specific subject, and making the specified alterations when the recording is determined to comprise the specific subject.

20. Apparatus for maintaining privacy of subjects of recordings, comprising:
    at least one device for use by a subject, arranged to enable a level of privacy of the subject and to provide a location of the subject to a database, wherein the level of privacy is selected from a plurality of levels of privacy;
    at least one recording device the location of which is provided to the database, from the recording device, when a recording is made;
    the database being arranged to compare the location of the subject with the location of at least one recording device, to determine from the comparison of the provided locations whether at least one subject is in the recording and to limit use of the recording by applying the level of privacy of the subject if the recording includes said subject that uses at least one device.

21. Apparatus according to claim 20, wherein the database is arranged, when at least one subject is determined to be in the recording, to inform a person possessing the recording that at least one subject is in the recording.

22. Apparatus according to claim 20, wherein the at least one device for use by a subject is arranged to determine the location of the subject repeatedly.

23. Apparatus according to claim 22, wherein the at least one device for use by a subject is arranged to provide at a succession of times the time and the location of the subject, and to transmit the provided times and locations to the database.

24. Apparatus according to claim 20, wherein at least one recording device is fixed, and wherein the database contains the location of that recording device.

25. Apparatus according to claim 20, wherein at least one recording device is fixed, and wherein the database contains information specifying a field of that recording device.

26. Apparatus according to claim 20, wherein at least one recording device is mobile and is arranged to provide the location of the recording device to the database.

27. Apparatus according to claim 26, wherein the at least one recording device is arranged to append to a recording the location of the recording device.

28. A method of asserting privacy for a subject, comprising:
registering a desire for privacy for the subject with a database, wherein registering a desire for privacy comprises registering a category of thing to which the subject belongs, and a property of that thing that it is desired to prevent publication of;
activating a privacy enablement device (PED) to enable a level of the privacy of the subject, wherein the level of privacy is selected from a plurality of levels of privacy;
receiving a location of the subject from the PED, wherein the subject carries the PED;
recording the location of the subject with the database; and
limiting use of the recording by applying the level of privacy of the subject if the recording includes said subject that uses the PED.

29. A method according to claim 28, wherein determining the subject's location comprises operating a device that repeatedly determines the location of the device, and wherein recording the subject's location with the database comprises the device transmitting to the database the determined locations.

30. A method according to claim 29, wherein the device transmits each determined location substantially immediately.

31. A method according to claim 29, wherein the device stores determined locations, and the time at which each location was determined, and subsequently transmits the locations and times.

32. A method of protecting privacy, comprising:
activating a privacy enablement device (PED) to enable a level of the privacy of the subject, wherein the level of privacy is selected from a plurality of levels of privacy;
receiving, from the PED, and storing subject location data indicating a location of at least one subject at a specified time, wherein the subject location data is received from the PED;
receiving recorder location data indicating a location of a recording device, from the recording device, when a recording is made;
comparing the subject location data with the recorder location data;
determining from the comparison whether at least one subject may be in the recorded data; and
limiting use of the recording by applying the level of privacy of the subject if the recording includes said subject that uses the PED.

33. A method according to claim 32, wherein limiting use of the recording including said subject further comprises limiting the use of parts of the data in which it has been determined that at least one subject may be present.

34. A method according to claim 32, wherein limiting use of the recording including said subject further comprises identifying at least one subject in the recorded data, and altering the recorded data to remove data relating to the at least one subject.

35. A method according to claim 34, wherein the recorded data comprises images, and altering the recorded data comprises rendering the subject at least in part unrecognizable.

36. A method according to claim 32, wherein the subject location data indicates the locations of the at least one subject at a succession of times, and comparing the stored subject location data with the recording location data comprises determining a trajectory of the subject and comparing the trajectory with the recording location data.

37. Apparatus for protecting privacy, comprising:
activating means for a privacy enablement device (PED) for enabling a level of the privacy of the subject, wherein the level of privacy is selected from a plurality of levels of privacy;
storing means for storing subject location data indicating a location of at least one subject at a specified time, wherein the subject location data is received from the PED;
receiving means for receiving recording location data indicating a location of a recording device, from the recording device, when data was recorded;
comparing means for comparing the stored subject location data with the recording location data;
determining means for determining from the comparison whether at least one subject may be in the recorded data; and
means for limiting use of the recording including said subject that uses the PED by applying the level of privacy of the subject.

38. Apparatus according to claim 37, wherein the means for limiting use of the recording including said subject further comprises identifying means for identifying at least one subject in the recorded data, and altering means for altering the recorded data to remove data relating to the at least one subject.

39. Apparatus according to claim 38, wherein the recorded data comprises images, and the altering means is arranged to render the subject at least in part unrecognizable.

40. Apparatus according to claim 37, wherein the subject location data indicates the locations of the at least one subject at a succession of times, and the comparing means is arranged to determine a trajectory of the subject to compare the trajectory with the recording location data.

41. Apparatus according to claim 37, further comprising locating means associated with the at least one subject for determining the location of the locating means and transmitting the determined location to the storing means as said subject location data.

* * * * *